United States Patent [19]

Sakamoto

[11] Patent Number: 4,884,777
[45] Date of Patent: Dec. 5, 1989

[54] SEAT SUSPENSION DEVICE

[75] Inventor: Takao Sakamoto, Akishima, Japan

[73] Assignee: Tachi-S Co., Ltd., Tokyo, Japan

[21] Appl. No.: 227,423

[22] Filed: Jul. 29, 1988

[51] Int. Cl.[4] .............................................. B60N 1/02
[52] U.S. Cl. .................................... 248/588; 248/608;
  248/575; 267/154
[58] Field of Search ............... 248/588, 561, 575, 587,
  248/590, 595, 608, 566, 563; 297/338, 345;
  267/154

[56] References Cited

U.S. PATENT DOCUMENTS

| | | | |
|---|---|---|---|
| 3,140,851 | 7/1964 | Bilancia | 248/608 X |
| 3,788,586 | 1/1974 | McNally | 248/608 X |
| 3,813,073 | 5/1974 | Mohr et al. | 248/608 |
| 4,566,667 | 1/1986 | Yanagisawa | 248/561 |
| 4,729,539 | 3/1988 | Nagata | 248/588 X |

FOREIGN PATENT DOCUMENTS 598458 1/1948 United Kingdom ............... 248/399

Primary Examiner—Ramon S. Britts
Assistant Examiner—Karen J. Chotkowski
Attorney, Agent, or Firm—Browdy and Neimark

[57] ABSTRACT

A seat suspension device including an elastic biasing mechanism for elastically biasing a seat frame away from a lower base frame, a locking mechanism for locking the seat frame to thereby place the seat suspension device in a locked state, and a biasing force adjustment mechanism for adjusting the biasing force of the elastic biasing mechanism. The locking mechanism is so arranged that it will bring to a locked state the seat suspension device when the biasing force of the elastic biasing mechanism is reduced to a lowest degree by operation of the biasing force adjustment mechanism. Accordingly, by merely operating the biasing force adjustment mechanism, both biasing force adjustment and locking/unlocking operation are effected.

6 Claims, 3 Drawing Sheets

SEAT SUSPENSION DEVICE

BACKGROUND OF THE INVENTION

1. Field of the Invention

The present invention relates to a seat suspension device for an automotive seat, and in particular relates to an improvement of a seat suspension device which uses a biasing means such as a torsion bar or other elastic element for adjustment of seating height elastically according to the weight of a an occupant on the seat.

2. Description of the Prior Art

In most of ordinary seat suspension devices, there has been employed a spring or torsion bar as a biasing means in order that the seat frame on the suspension device is kept biased upwardly to elastically support an occupant on the seat.

Let us assume that the torsion bar is used in the seat suspension device, the conventional types thereof are, by and large, of the construction that an operation lever is rotatably secured on one side of a seat frame and coaxially connected with a cam having plural discrete cam surfaces, and a torsion bar is interposed between the upper seat frame (i.e. seat cushion frame) and lower base frame fixed to a floor of automobile, with one end of the torsion bar being abutted against one of the discrete cam surfaces of the cam. The rotation of the operation lever causes the simultaneous rotation of the cam, so that another different cam surface is contacted with the one end of the torsion bar, thus resulting in the change of the torsion stress of the torsion bar to bring about the adjustment of upwardly biasing force upon the seat. An occupant therefore may attain an optimal seating height according to his or her weight.

In such prior art, a locking means is provided independently of the suspension device, to permit locking and unlocking of the upper seat frame against the lower base frame. An example of this locking means is found from the U.S. Pat. No. 4,566,667 in which the locking mechanism is disposed forwardly of the seat frame, comprising an operation lever, a lock plate having a series of hook-like engagement notches, and a lock pin. When the operation lever is rotated, the lock plate is rotated simultaneously to bring one of the notches into engagement with or disengagement from the lock pin for locking/unlocking purposes, allowing the adjustment of seating height.

However, the above-mentioned prior art is disadvantageous in that an occupant on the seat has to experience quite annoying trouble of standing away from the seat and bending his or her body to reach the operation lever for unlocking and locking operations in order to adjust the seat suspension device, and further in that the operation procedures involves two separate steps of: first, rotating the lever of the locking mechanism to unlock the seat suspension device, and second rotating the lever associated with the cam for adjustment of the biasing means. Hence, the operationability of the prior art is poor, requiring much labor effort on the part of the occupant, and thus being time-consuming.

SUMMARY OF THE INVENTION

With the above-mentioned drawbacks of prior art in view, it is a purpose of the present invention to provide an improved seat suspension device which permits both lock operation and biasing force adjustment in a simultaneous way through one simple operation, with no trouble of bodily motion of an occupant on the seat.

In accomplishment of such purpose, the present invention comprises an elastic biasing element such as a torsion bar disposed between a seat frame and a lower base frame such as to elastically bias the seat frame upwardly relative to the lower base frame fixed on the floor of automobile, a biasing force adjustment mechanism diposed at the lower base frame, the biasing force adjustment mechanism being adapted for adjusting the biasing force of the elastic biasing element, and including an operation lever, and a locking mechanism including a hook member and a hook engagement member, the hook member being integrally provided on the operation lever of the biasing force adjustment mechanism and the hook engagement member being fixed on the upper seat frame, so as to permit the engagement and disengagement of the hook member with and from the hook engagement member. In this construction, in accordance with the present invention, the operation lever is disposed at the lateral side of the seat, and it is so arranged that, when the operation lever is rotated, causing the engagement of the hook member with the hook engagement member, the biasing force of the elastic biasing element becomes reduced, and upon the engagement of the hook member, the biasing force reaches its lowest degree. Thus, it is seen that the seat suspension device may be placed in a locked sate, with its biasing force being at the lowest degree.

Accordingly, by simply rotating the operation lever, both biasing force adjustment mechanism and locking mechanism are simultaneously actuated to easily effect the biasing force adjustment and locking/ unlocking operation of the seat suspension device, without further steps of operation. Also, since the operation lever is disposed laterally of the seat, an occupant on the seat does not need to change his posture greatly and can work the seat suspension device at one operation with his or her seating state.

DETAILED DESCRIPTION OF PREFERRED EMBODIMENT OF THE INVENTION

Figure 1:
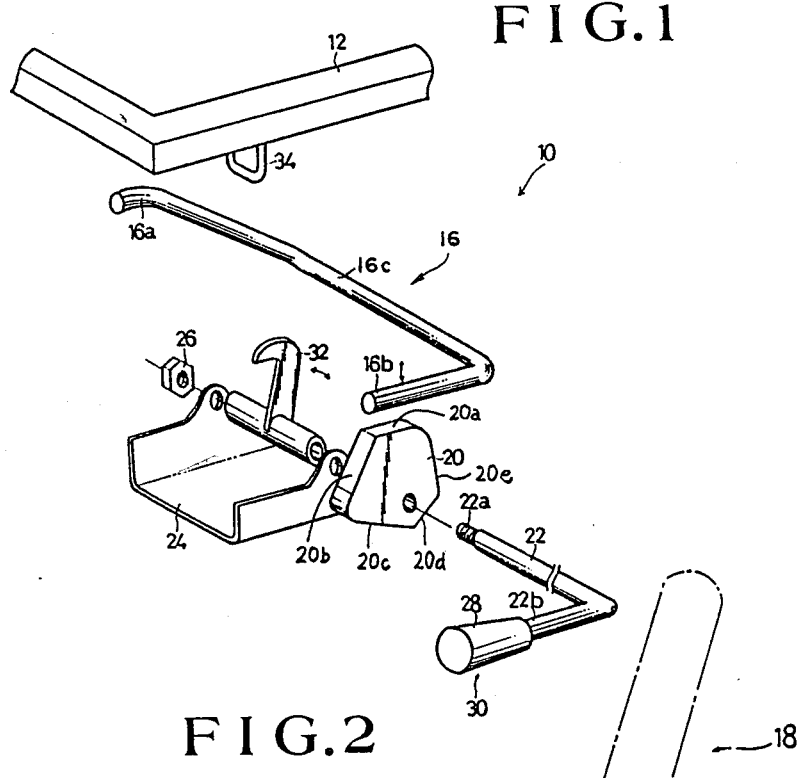
FIG. 1 is a schematic perspective view of principal portion of the seat suspension device in accordance with the present invention.

Referring to FIGS. 1 through 4, there is illustrated a first embodiment of seat suspension device, which is designated at (10), in accordance with the present invention.

Basically, in the present embodiment, the seat suspension device (10) comprises a seat frame (12) upon which a seat (18) is mounted, a lower base frame (14) fixed on the floor of an aubtomobile (not shown), an elastic biasing element (16), a biasing force adjustment mechanism (20, 30), and a locking mechanism (32, 34), as can be seen in those figures.

Now, specifically, as the elastic biasing element, there is provided a torsion bar (16) formed in a substantially ⎿‾‾⏋ shaped configuration, comprising a central bar section (16c) and a pair of first and second bar sections (16a)(16b) extending from the central bar section (16c) at a right angle relative thereto, with the first bar section (16a) orienting upwardly in an oblique manner and the second one (16b) extending horizontally, respectively, from the central bar section (16c). Such torsion bar (16) is provided between the seat frame (12) and lower base frame (14) such that the free end of its first bar section (16a) is in contact with the lower surface of the seat frame (12), while that of its second bar section (16b) is abutted against a cam (20) forming a part of the biasing adjustment mechanism provided on the lower base frame (14). Thus, the torsion bar (16) is adapted to normally bias the seat frame (12) in an upward direction with respect to the lower frame (14), to thereby elastically support the seat (18).

The cam (20) is fixed on the shaft section (22) of an operation lever (30). Cam (20) and operation lever (30) form the biasing force adjustment mechanism which is adapted for adjustably varying the biasing force of the torsion bar (16) against the seat frame (23). For that purpose, specifically, the cam (20) has a plurality of discrete cam surfaces (20a)(20b)(20c)(20d)(20e) formed at its circumference and the operation lever (30) is at its shaft section (22) rotatably supported on a bracket (24) which is fixed on the lower base frame (14). As best shown in FIG. 1, the operation lever (30) comprises a handle portion (28), rod portion (22b) and the foregoing shaft section (22) which extends at a right angle relative to the rod portion (22b) in a direction inwardly of the lower base frame (14). The end portion of the second bar section (16b) is abutted against one of the discrete cam surfaces (20a)(20b) (20c)(20d)(20e) of the cam (20). Accordingly, when the operation lever (30) is raised or lowered, in other words, rotated vertically, the shaft section (22) is rotated, causing the simultaneous rotation of the cam (20) which in turn alters its cam surfaces from one to another for abutment with the end of the second bar section (16b) of the torsion bar (16), whereby the torsion rate of the torsion bar (16) is varied according to each different level of the cam surfaces of the cam (10) to give a small or high or other desired degree of biasing force against the seat frame (12). In that way, an occupant on the seat may adjust the biasing force of the torsion bar (16) by operating the operation lever (30) at a proper degree in accordance with his or her weight.

It is noted here that the shaft section (22) may be integrally formed with the operation lever (16) or may be formed independently of and connected with the latter, and that the free end portion of the shaft section (22) is formed with an externally threaded portion (22a) for threaded engagement with a nut (26), whereupon the shaft section (22) extends rotatably through the cam (20) and bracket (24) to permit the rotation of the operation lever (30) about the axis of the shaft section (22) and thus the rotation of the shaft section (22) as well as of the cam (20).

As the locking mechanism, there are provided a hook member (32) and a hook engagement member (34). The hook member (32) is welded on the shaft section (22). The hook engagement member (34) is of a substantially U-shaped configuration and fixed on the lower surface of the seat frame (12) in a manner dependent therefrom. In this context, it should be noted that the hook member (32) is disposed at point corresponding to the position of the hook engagement member (34) so that the hook member (32) is accurately engaged into the hook engagement member (34).

In accordance with the present invention, the arrangement of the hook member (32) upon the foregoing biasing force adjustment mechanism; in other words, the interrelation between the hook member (32), cam (20) and the operation lever (30), is designed so that the engagement of the hook member (32) with the the hook engagement member (34) is established at the point where the biasing force of the torsion bar (16) is reduced to a lowest degree by operation of the lever (30) for bringing the corresponding cam surface of the cam (20) in abutment relation with the torsion bar (16). This aspect will be more specifically described as below.

Figure 2:
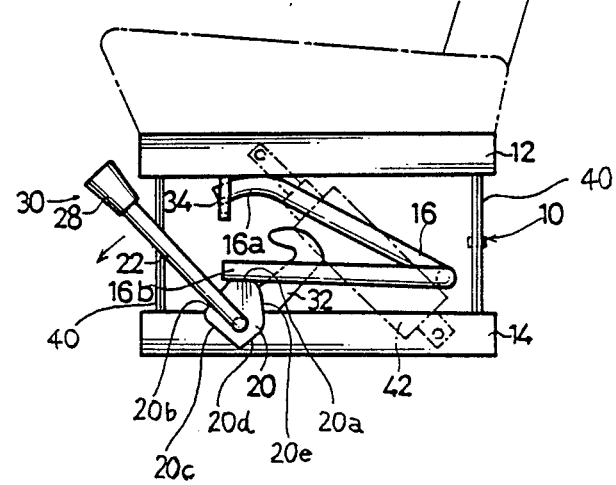
FIG. 2 is a side view of the seat suspension device of the present invention, which shows the normal, unlocked state thereof.

First, when it is desired to adjust the biasing force of the torsion bar (16) for a proper elastic seating support, the hook member (32), as shown in FIG. 2, is located away from the hook engagement member (34), thereby allowing the rotation of the cam (20) through the operation of the lever (30) to change the torsion rate of the torsion bar (16).

At the status shown in FIG. 2, the end of the second bar section (16b) of the torsion bar (16) is abutted against the cam surface (20a) of the cam (20).

From that status, when an occupant on the seat wishes to lock the seat suspension device, he or she rotates the operation lever (30) downwardly in the direction of the arrow. Simultaneously with the rotation of the lever (30), the shaft section (22) and the cam (20) as well as the hook member (32) are caused to rotate in a counterclockwise direction, with the cam surface of the cam (20) being changed from the first one (20a) to the second one (20e) whose level is smaller that the first one. Thus, the torsion rate of the torsion bar (16) is reduced due to such level lowering of cam surface of the cam (20), and there occurs the consequent gradual lowering of the the seat frame (12) with the occupant thereon.

The third cam surface (20d) is so formed as to have a lowest level of other cam surfaces in the cam (20) to produce a smallest torsion rate in the torsion bar (16) being abutted thereagainst. Therefore, the hook member (32) is disposed on the shaft section (22) of the lever (30) such that it is positioned uprightly for engagement into the hook engagement member (34) when the third cam surface (20d) is brought to contact with the end of the second bar section (16a) of the torsion bar (16).

Figure 3:
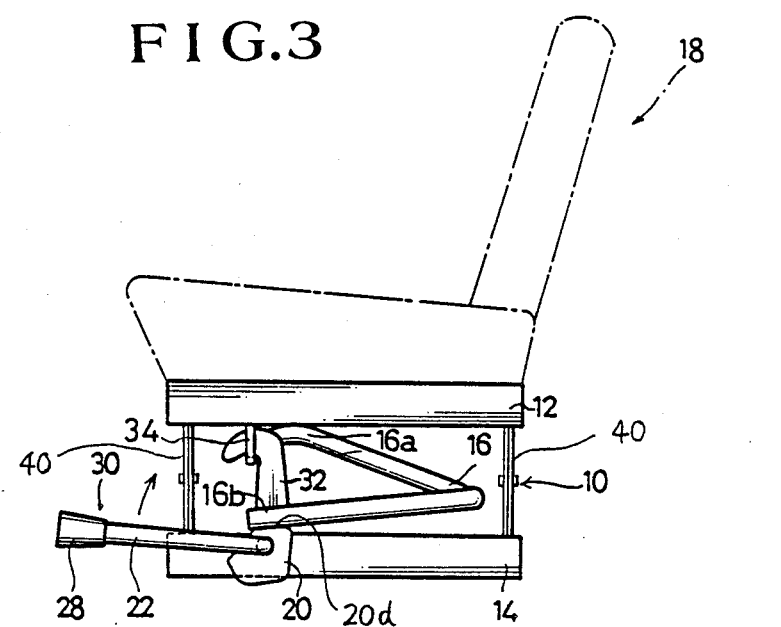
FIG. 3 is a side view of the seat suspension device of the present invention, which shows the locked state thereof.

As the operation lever (30) continues to be rotated until the third cam surface (20d) is contacted with the end of the second bar section (16b) of the torsion bar (16), as shown in FIG. 3, the hook member (32) is rotated and positioned uprightly or generally vertically relative to the lower base frame (14), and at the same time, the torsion rate of the torsion bar (16) decreases down to a lowest degree (thus the upwardly biasing force of the same against the seat frame (12) is reduced at a lowest degree). In the course of such action, simultaneously, the seat frame (12) and hook engagement member (34) are lowered with the weight of the occupant thereon. Thus, the hook member (32) is engaged into the hook engagement member (34), thereby placing the seat suspension device (10) in a locked state.

Accordingly, it is appreciated that by simply operating the lever (30), the biasing force of the torsion bar

(16) is adjusted and, as desired, the locking of the seat suspension device (10) can be effected in a continuous manner followed by the biasing force adjustment of the torsion bar (16), which makes extremely easy and rapid the locking operation as well as the elastic support adjustment. Further, the provision of the operation lever (30) at the lateral side of the seat (18) advantageously eliminates the trouble of body bending action on the part of the occupant to reach the lever (30).

In addition, there is no need to provide a separate lever for locking the seat suspension device, and so the number of parts is reduced, with a far simplified structure, which contributes to a low-cost production of the seat suspension device.

To effect unlocking operation, as shown in FIG. 3, the operation lever (30) is rotated upwardly in the arrow direction to cause the clockwise rotation of the hook member (32). Then, the hook member (32) is disengaged from the hook engagement member (34) to release the locked state of the seat suspension device (10), allowing the adjustment of the biasing force of the torsion bar (16) to be effected by an occupant on the seat under the variation of the cam surfaces of the cam (20) as mentioned before.

Figure 4:
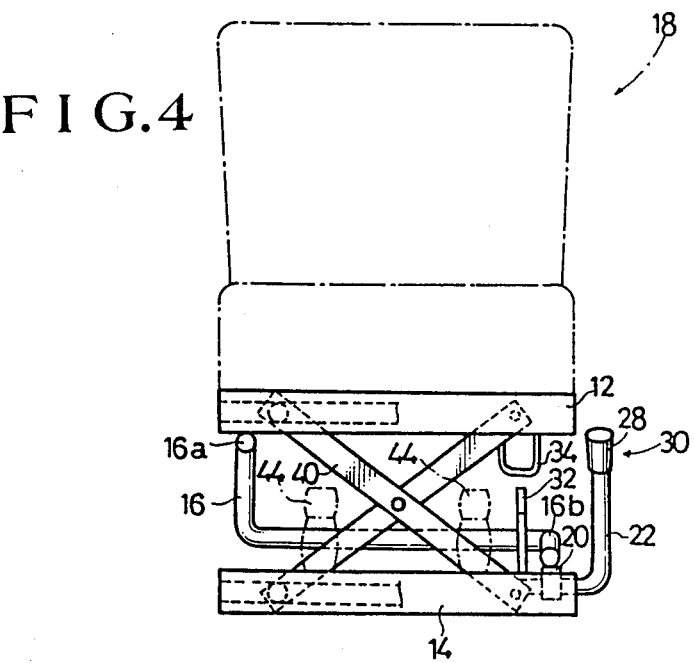
FIG. 4 is a front view of the same, showing the unlocked state thereof.

As best shown in FIG. 4, there are provided a pair of X-shaped links between the seat frame (12) and lower base frame (14) in a vertically expandable/contractable manner, such that one of them is disposed at the forward part of the seat (18) and the other of them is disposed at the rear part of the seat (18). But, the X-shaped links may be provided at the respective lateral sides of the seat (18). Also, as indicated by the phantom line in FIG. 2, a shock absorber (42) is provided on the other side of the seat such that it is, at its both ends, pivotally fixed on the respective seat frame (12) and lower base frame (14).

In FIG. 4, designations (44)(44) denote a pair of stoppers adapted to limit the lowering of the seat frame (12) and absorb a great impact caused by a sudden lowering of the seat frame (12). The stoppers (44)(44) are preferably made of a hard rubber material or a spring.

In the illustrated embodiment, the hook member (32) is disposed at the lower base frame (14) and the hook engagement member (34) is fixed on the seat frame (12), but the two members (32)(34) may be arranged reversely so that the former is disposed at the seat frame (12) and the latter at the lower base frame (14).

Figure 5:
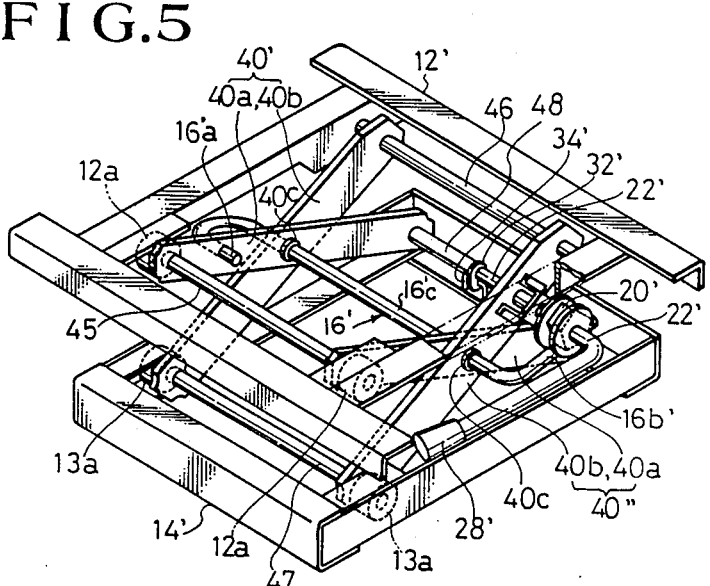
FIG. 5 is a perspective view of another embodiment of the present invention.
Figure 6:
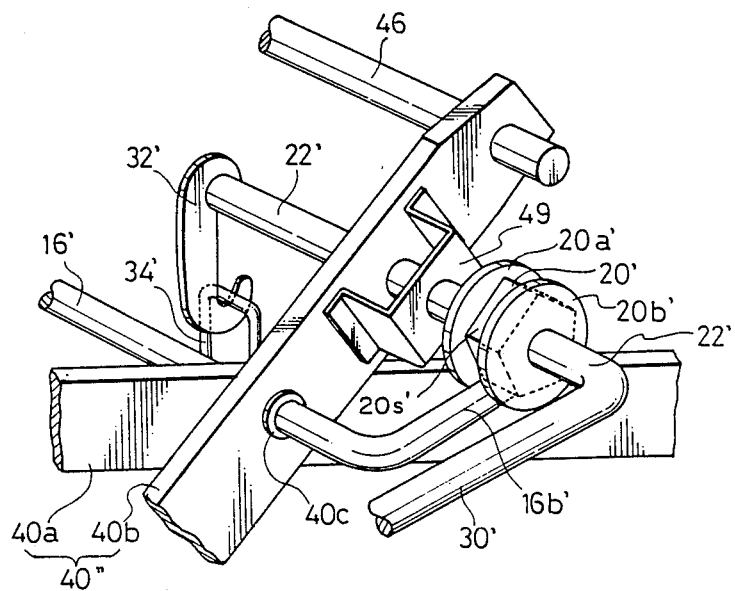
FIG. 6 is a partly enlarged perspective view of the principal portion of such another embodiment.

Now, referring to FIGS. 5 and 6, there is illustrated the second embodiment of the present invention, in which a torsion bar (16') is provided on a pair of X-shaped links (40')(40").

Specifically, designations (12') and (14') denote a seat frame and lower base frame, respectively, and there are provided a pair of X-shaped links (40') (40") between the seat frame (12') and lower base frame (14') such that they are disposed at the respective sides of the latter frames. The construction of the X-shaped links (40')(40") is such that the one X-shaped link (40') comprises a first link piece (40a') and a second link piece (40b') in a crossed manner whereas the other X-shaped link (40") comprises a first link piece (40a") and a second link piece (40") in a crossed manner, with a pivot ring member (40c) being provided at each crossed point of those X-shaped links (40')(40"). The first link pieces (40a')(40a") are at their respective lower ends slidably secured on the forward part of the lower base frame (14') via rollers (13a')(13a"), as shown, and at their respective upper ends rotatably supported on the shaft (46) fixed at the rear part of the seat frame (12'), while on the other hand, the second link pieces (40b')(40b") are at their respective upper ends slidably secured at the forward part of the seat frame (12') via rollers (12a')(12a") and at their respective lower ends rotatably supported on the shaft (48) fixed at the rear part of the lower base frame (14'). With such structure, the X-shaped links (40')(40") are permitted to be raised or lowered in a vertically expandable/contractable manner.

The pivot ring members (40c)(40c) are each formed in a bush-like structure having a through bore (not shown) therein. The torsion bar (16') is of a generally S-shaped configuration, comprising a central horizontal bar section (16c') and a pair of oppositely bent first and second bar sections (16a')(16b"). The first and second bar sections (16a')(16b') extend from both ends of the central bar section (16c') in a direction opposite to each other at a right angle relative thereto. The central bar section (16c') of the torsion bar (16') extends through the through bores of the two pivot ring members (40c)(40c).

In the present embodiment, the torsion bar (16') forms an elastic biasing element, and as a biasing force adjustment mechanism, there are provided a cam (20') and an operation lever (30'). The cam (20') is fixed on the shaft section (22') of the operation lever (30'), having a plurality of discrete cam surfaces generally designated by (20s') which are similar in construction to those of the cam (20) of the previously mentioned first embodiment and the specific description is omitted. The cam (20') is at its both lateral surfaces provided with a pair of disc-like guide members (20a')(20b') respectively. The operation lever comprises a handle portion (38'), a rod portion (21'), and the foregoing shaft section (22') which extends from the rod portion (21') at a right angle relative thereto and further extends through the upper part of the second link piece (40b"). Thus-formed operation lever (30') is rotatably supported at that upper part of the second link piece (40b") and further rotatably supported by a bracket (49) fixed on the corresponding upper pat of the second link piece (40b"). Hence, it is seen that both cam (20') and operation lever (30') are rotatable about the axis of the shaft section (22').

The second bar section (16b') of the torsion bar (16) extends towards the cam (20'), with its end portion underlying the cam (20') and being abutted against one of the plural cam surfaces of the cam (20'). The first bar section (16a') of the torsion bar (16) is bent in a curved manner, and its end is inserted through and secured at a hole (not shown) formed at the upper region of the first link piece (40').

Accordingly, the seat frame (12') is elastically biased upwardly away from the lower base frame (14') by virtue of the torsion force of the torsion bar (16') thus constructed, via the X-shaped links (40') (40"), and the biasing force of the torsion bar (16') is adjusted by the variation of discrete cam surfaces of the cam (20') being rotated by the operation lever (30') substantially in the same manner as in the first embodiment.

As a locking mechanism, arranged are a hook member (32') and a hook engagement member (34') in such a manner that the former is fixed on the free end portion of the shaft section (22') of the operation lever (30'), and the latter is fixed at the side of lower base frame (14') or on a suitable part of the lower base frame (14'). It should be noted that the hook engagement member (34') is disposed at a point corresponding to the position of the hook member (32') so that the hook member (32') is accurately engaged into the hook engagement member (34').

Similarly to the aforementioned first embodiment, the interrelation between the hook member (32'), cam (20') and operation lever (30') is designed such that the engagement of the hook member (32') with the hook engagement member (34') is established at the point where the biasing force of the torsion bar (16') is reduced to a lowest degree, by operation of the lever (30') for bringing the corresponding cam surface of the cam (20) in abutment relation with the torsion bar (16). Thus, the locking and unlocking operations continuously followed by the biasing force adjustment, as described in the first embodiment, can be conducted in this particular second embodiment. The specific steps of operation in this respect is generally the same a that of the first embodiment, except that the hook member (32'), when engaged into the hook engagement member (34'), is situated vertically dependent from the shaft section (22'), as opposed to the upright position of the hook member (32) of the first embodiment being engaged into the hook engagement member (34), and as such, further specific description thereon is deleted.

While having been described above, in both first and second embodiments of the present invention, the cams (20)(20') may be replaced by another means for varying the torsion rate of the torsion bars (16) (16'), and the elastic biasing element is not limited to the torsion bars (16)(16') but may be a tension spring, leaf spring, or any other proper element that can produce an adjustable biasing force against the seat frames (12)(12'). Further, the present invention is not merely applied to automotive seats, but may be applied to an ordinary seat including the one used for an office desk, a meeting, a movie theater, or any other purposes. It should be understood that the present invention is not limited to the illustrated embodiments, but any various modifications, replacements, and additions may structurally be possible without departing from the spirit and scope of the appended claims for the invention.

What is claimed is:

1. A seat suspension device including a seat frame on which a seat is mounted and a lower base frame fixed on a floor, said seat suspension device comprising:
   an electric biasing means interposed between said seat frame and said lower base frame, said elastic biasing means being adapted to elastically bias said seat frame away from said lower base frame;
   a locking mechanism interposed between said seat frame and said lower base frame; and
   a biasing force adjustment means for adjusting a biasing force of said elastic biasing means against said seat frame,
   wherein said locking mechanism is so arranged as to lock said seat frame with respect to said lower base frame when the biasing force of said elastic biasing means is reduced at a lowest degree by means of said biasing force adjustment means, and
   wherein said locking mechanism comprises a hook member and a hook engagement member, wherein said biasing force adjustment means comprises an operation lever rotatably supported between said seat frame and lower base frame, and a cam having a plurality of discrete cam surfaces, said cam being fixed on the operation lever, and wherein said hook member is fixed on said operation lever, and said elastic biasing means is abutted against said cam, whereby rotation of said operation lever causes simultaneous rotation of said cam and hook member, with such an arrangement that, when said cam presents a cam surface of such a level as to reduce the biasing force of said elastic biasing means at a lowest degree, during the rotation of said cam, said hook member is brought to engagement with said hook engagement engagement member.

2. The seat suspension device according to claim 1, wherein said elastic biasing means comprises a torsion bar formed in a substantially ⊐ shaped configuration, and wherein one end of said torsion bar is attached to said seat frame and the other end thereof is operatively contacted with said biasing force adjustment means.

3. The seat suspension device according to claim 1, wherein said hook engagement member is formed in a substantially U shape.

4. The seat suspension device according to claim 1, wherein said biasing force adjustment means comprises an operation lever and a cam having a plurality of discrete cam surfaces, said cam being fixed to said operation lever.

5. The seat suspension device according to claim 1, wherein said operation lever is disposed at lateral side of said seat frame and lower base frame.

6. The seat suspension device according to claim 1, wherein there is provided a pair of X-shaped links between said seat frame and said lower base frame, such that said seat frame is vertically movable towards and away from said lower base frame, wherein said elastic biasing means comprises a substantially S-shaped torsion bar, which has a central bar section and a pair of oppositely extending first and second bar sections, such that they extend from respective ends of said central bar section in a direction opposite to each other, and wherein said central bar section of said torsion bar extends through respective crossed pivot points of said pair of X-shaped links, said first bar section of said torsion bar is secured on one of said X-shaped links and said second bar section thereof is abutted against said biasing force adjustment means at the side of the other of said X-shaped links.

* * * * *